United States Patent
Brailovskiy et al.

(10) Patent No.: US 10,341,670 B1
(45) Date of Patent: Jul. 2, 2019

(54) VIDEO ENCODER BIT RATE STABILIZATION

(71) Applicant: Amazon Technologies, Inc., Seattle, WA (US)

(72) Inventors: Ilya Vladimirovich Brailovskiy, Mountain View, CA (US); Raul Izahi Lopez Hernandez, San Jose, CA (US); Qi Keith Wang, Cambridge (GB)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 16 days.

(21) Appl. No.: 15/716,061

(22) Filed: Sep. 26, 2017

(51) Int. Cl.
H04N 19/184 (2014.01)
H04N 19/114 (2014.01)
H04N 19/107 (2014.01)
H04N 19/124 (2014.01)

(52) U.S. Cl.
CPC ......... H04N 19/184 (2014.11); H04N 19/107 (2014.11); H04N 19/114 (2014.11); H04N 19/124 (2014.11)

(58) Field of Classification Search
CPC .. H04N 19/102; H04N 19/114; H04N 19/115; H04N 19/126; H04N 19/134; H04N 19/14; H04N 19/147
USPC .................................. 375/240.02, 240.23
See application file for complete search history.

(56) References Cited

U.S. PATENT DOCUMENTS

| | | | | |
|---|---|---|---|---|
| 2010/0150168 A1* | 6/2010 | Chatterjee | .......... | H04N 21/2365 370/465 |
| 2016/0198166 A1* | 7/2016 | Kudana | ................ | H04N 19/194 375/240.15 |
| 2018/0184092 A1* | 6/2018 | Jung | .................... | H04N 19/154 |
| 2018/0300839 A1* | 10/2018 | Appu | ........................ | G06T 1/20 |
| 2019/0052878 A1* | 2/2019 | Zhao | .................... | H04N 19/124 |

* cited by examiner

*Primary Examiner* — Dominic D Saltarelli
(74) *Attorney, Agent, or Firm* — K&L Gates LLP (57) ABSTRACT

Techniques are generally described for bit rate stabilization. In various examples, an encoder may identify a first frame of video data to be encoded using a first quantization value. In some examples, the encoder may determine an estimated compressed frame size of the first frame encoded using the first quantization value. In various examples, the encoder may determine that the estimated compressed frame size is less than threshold size. The encoder may further determine a second quantization value that may be less than the first quantization value. The encoder may generate a compressed first frame of video data using the second quantization value and the first frame of video data. The compressed first frame may be sent to a recipient computing device.

20 Claims, 6 Drawing Sheets

VIDEO ENCODER BIT RATE STABILIZATION

BACKGROUND

Video and/or other media may be sent between computing devices over a network. In some examples, videos may be encoded by a server, sent to a client computing device, decoded and played back while subsequent portions of the video are still being transmitted to the client computing device by the server. Such video transmission and playback is often referred to as "streaming". In some other examples, videos and/or other media may be encoded by a server and sent to one or more remote computing devices for further processing. Network conditions can change during transmission of video and/or other media for various reasons. For example, network conditions may sometimes deteriorate which may lead to delays in streaming of video and/or other data. In some examples, servers may adjust characteristics of the video stream in order to compensate for changing network conditions. For example, servers may adjust the bitrate of the video stream to account for a monitored and/or estimated change in bandwidth.

DETAILED DESCRIPTION

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

Video may be encoded with various transmission attributes (e.g., bitrates, resolutions, profiles, frame rates, etc.) prior to sending the video over a network to a remote computing device. Web Real-Time Communication ("WebRTC") comprises a number of communication protocols and application programming interfaces ("APIs") that enable real time communication over peer-to-peer connections. WebRTC may use Real-time Transport Control Protocol ("RTCP") to transmit audio and/or video over a network.

In WebRTC a sending device sends packets of encoded video that may be received and decoded by a recipient device. The packets of encoded video may be encoded based on current network conditions at the time of the encoding. For example, an encoder of the sending device may encode a video stream at a first bitrate based on current network conditions and based on source video complexity (e.g., complexity of frames of image data of the video). Thereafter, network conditions may deteriorate due to increased network traffic and congestion. Accordingly, the end-to-end time between sending a packet of the video by the sending device and receipt of the packet by the recipient device may increase (e.g., the latency may increase). In response to the slowed network conditions, the recipient device may send a Receiver Estimated Maximum Bitrate ("REMB") message. The REMB message may include a field to convey the total estimated available bitrate on the network path to the receiving side of the real-time transport protocol ("RTP") session (e.g., the connection between the sending device and the recipient device). The sending/encoding device may use the bitrate specified in the REMB message to configure the maximum bitrate of the video encoding.

Techniques for stabilizing a bit rate used in WebRTC and video streaming generally are described herein. In digital video technology, a video may be represented by a number of video frames that may be displayed in sequence during playback. A video frame is comprised of rows and columns of pixels. The resolution of a particular video frame is described by the width of the frame, in terms of a first number of pixels, by the height of the frame, in terms of a second number of pixels. Video frames may be compressed using different picture types or frame types, such as Intra-coded picture frames, predicted picture frames, and/or bi-predictive frames. The term "frame" can refer to an entire image captured during a time interval (e.g., all rows and columns of pixels comprising the particular image). The term "picture" can refer to either a frame or a field. A "field" is a partial image of a frame, which can be represented by either the odd-numbered or even-numbered scanning lines of the frame. Reference frames are frames of a compressed video that are used to define future frames. A compressed video may comprise one or more frames that do not include all of the pixel data within the frames themselves, but rather reference pixel values of other frames (e.g., reference frames). Intra-coded picture frames ("I-frames") include detailed pixel data in order to be self-decodable and to provide reference pixel values for other inter-coded picture frames. As a result, I-frames do not require other video frames in order to be decoded, but provide the lowest amount of data compression and accordingly, typically require more to send over a network relative to other frame types. Predicted picture frames ("P-frames") contain only the changes in the pixel values from previous frames, and therefore P-frames use data from previous frames to decompress and decode the P-frame. As a result, P-frames are more compressible than I-frames and require less bandwidth to transmit. Bi-directional predictive picture frames ("B-frames") can be decoded using both previous and forward frames for data reference.

As used herein, the "size" of a frame may refer to the amount of memory needed to store a particular compressed frame and/or the amount of available bandwidth required to transmit the compressed frame. In at least some examples, frames with higher resolution (e.g., more pixels in the two-dimensional grid of the frame) may be larger in size relative to a lower resolution frame. In some further examples, source video content with higher complexity (e.g., content with higher spatial complexity and/or higher motion content (e.g., temporal complexity) may be encoded into frames of larger size as the frames may require more bits to encode relative to a less complex frame. In various examples, the complexity of a frame or group of frames may refer to the amount of bits required to encode the frame. As such, the frame size may be an indicator of the complexity of a frame. Frame complexity may be estimated using various methods and may be estimated prior to encoding a frame to generate a compressed frame. For example, raw, uncompressed frames of video data may be high-pass filtered in order to determine a spatial complexity of the frame. Generally, the spatial complexity may refer to an amount of entropy of transformed pixel data included within a frame. Higher spatial complexity generally indicates that more detailed and complex pixel data is present in the frame. The spatial complexity may be correlated to the compressed size of the frame. After the spatial complexity of a frame is determined, an estimated compressed size of the frame may be determined for a given quantization parameter based on the spatial complexity prior to compression of the frame. Accordingly, if the estimated frame size is smaller or larger than desired the quantization parameter used to compress the frame may be adjusted accordingly prior to encoding the frame. In various examples, the spatial complexity may be used as a proxy for estimated frame size. In other words, the spatial complexity value of a particular frame (e.g., an I-frame) may be compared with a spatial complexity threshold value (or tolerance) for a particular quantization parameter to determine if the current quantization parameter will result in a compressed frame that is either too large or too small. Adjustment of the quantization parameter may, in turn, affect the compressed frame size with higher quantization parameters resulting in smaller compressed frame sizes and lower quantization parameters resulting in larger compressed frame sizes. In various other examples, the complexity of raw, uncompressed frames of video data may be estimated using a linear regression. In various other examples, decreasing and/or increasing quantization parameters due to rate control may provide an indication of changing in-scene complexity.

Additionally, in various examples, the size of compressed frames of video data may be examined. If the size of a compressed frame is either larger or smaller than a desired size (e.g., not within a tolerance band of a target frame size), various encoders (e.g., encoder 121) may be effective to re-encode the compressed frame using a different quantization parameter, in accordance with the various techniques described herein.

Video streams of encoded pictures and/or frames may be encoded into groups of pictures ("GOPs"), and each GOP may begin with an intra-coded frame (I-frame) followed by one or more P-frames and/or B-frames. An I-frame may be referenced by subsequent inter-coded frames of the GOP, as described in further detail below. In at least some examples, I-frames may cause all reference pictures in the DPB (decoded picture buffer) to be flushed, so that no subsequent video frames can reference any frame of image data prior to the I-frame. This means that each GOP is self-decodable (i.e., doesn't depend on reference frames in previous GOPs). A GOP may set forth the length (in terms of a number of frames) and ordering of frames of a video. An I-frame typically indicates the beginning of a GOP, followed by one or more P-frames and/or one or more B-frames.

In various video streaming and/or WebRTC architectures, the uplink bandwidth of a video stream may be used to estimate the bitrate by a recipient device, such as recipient 130. Accordingly, in such architectures, if the bitrate from the transmitting device declines for any reason, the recipient device may interpret the bitrate decline as an indication that the available bandwidth has declined. Accordingly, the recipient device may send an REMB message that comprises an estimated maximum bitrate at which the video should be streamed. The encoder of the transmitting device may, in turn, use the estimated maximum bitrate of the REMB message to configure the maximum bitrate of the video encoding thereby reducing the maximum bitrate. Although the above-described scenario may be beneficial in some cases where the amount of available uplink bandwidth has declined due to network congestion and/or packet loss, in some other examples, the scenario above may result in needlessly lowering bitrates and thus video quality.

For example, a particular segment of a video may comprise one or more frames with relatively low complexity. For example, a number of frames may depict a static white background with little or no motion occurring from frame to frame. As such the sum of absolute differences (SAD) calculated for macroblocks of the frame may be relatively low or zero. Accordingly, the number of bits required to encode such frames may decline dramatically, as the frames may be inter-coded with a large percentage of skipped blocks (e.g., blocks of pixels with component values that do not change from frame to frame). Additionally, there may be very little motion data (e.g., motion vectors) associated with the frames, as little movement is depicted in the particular segment of video. If recipient 130 interprets the declining bitrate as an indication that the available bandwidth has declined and sends an REMB message with a lower estimated maximum bitrate, the video encoder may lower the bitrate based on the REMB message. Lowering the bitrate by the encoder may, in turn, result in reduced video quality and/or frame sizes, particularly when complex segments of the video depicting complex backgrounds and motions are encoded after lowering the bitrate. Accordingly, various techniques described herein may be used to achieve video encoder bit rate stabilization to prevent a "downward spiral" in bit rates and video quality.

Previous attempts to provide a constant bit rate employ bit stuffing (sometimes referred to as zero bit stuffing or bit packing). Bit stuffing involves inserting a number of 0-value or 1-value non-informational bits into the transmitted data in order to maintain a constant bit rate and/or to fill buffers and/or frames. The location(s) of the inserted bits is communicated to the recipient device which, in turn, may remove and/or disregard the extra inserted bits. However, the use of bit stuffing wastes available bandwidth without providing any additional benefit beyond a constant bit rate. The various techniques described herein allow for improved image and/or video quality while also providing bit rate stabilization.

Figure 1:
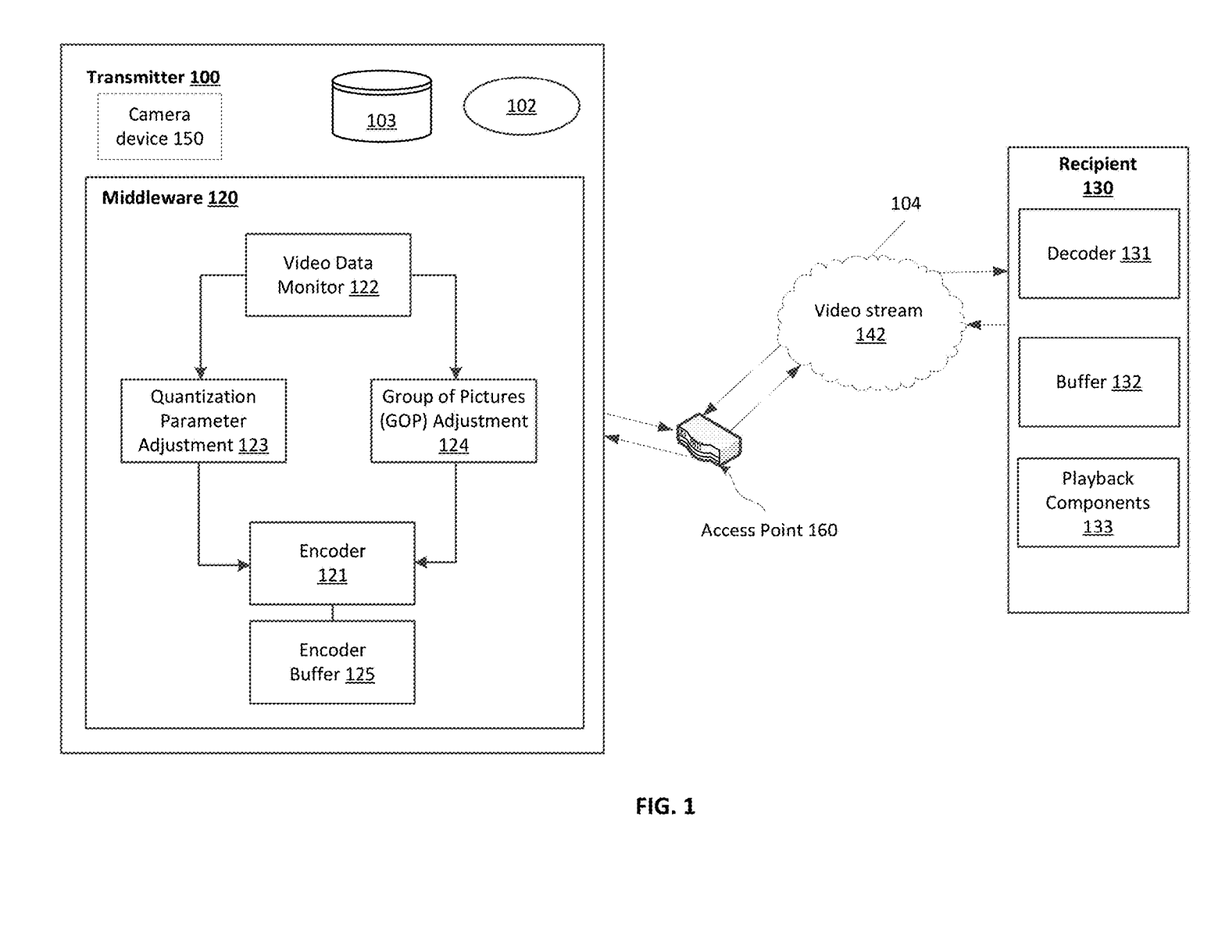
FIG. 1 depicts a system for performing video encoder bit rate stabilization, in accordance with various embodiments of the present disclosure.

FIG. 1 depicts a system for performing video encoder bit rate stabilization, in accordance with various embodiments of the present disclosure. The system in FIG. 1 may comprise a transmitter 100 (e.g., a computing device) effective to encode a video stream for delivery to one or more recipients 130 (e.g., client computing devices or image processing computing devices) over a network 104, in accordance with various embodiments of the present disclosure. Network 104 may be, for example, a local area network (LAN) and/or a wide area network (WAN) such as the Internet. In various examples, transmitter 100 may access network 104 via an access point 160. Access point 160 may be, for example, a router, a network switch, etc. and may be a wired or wireless access point.

In various examples, a video stream may be sent from transmitter 100 as video stream 142. Video stream 142 may include multiple renditions or may include a single rendition. Video stream 142 may be organized into video frames by encoder 121 of transmitter 100. In various examples, middleware 120 may control encoder 121 to control and stabilize the bit rate of video stream 142.

As described herein, a video frame may be, for example, a raster of pixels, with each pixel comprising a pixel value. Video frames may be sent from transmitter 100 over network 104 and received and presented by recipients 130 using streaming technology. Recipient 130 may include a decoder 131 effective to decode compressed frames of video stream 142 sent over network 104. Additionally, recipient 130 may comprise a buffer 132 effective to store frames of image data (e.g., frames to be used as a reference to encode other frames, such as I-frames). In various examples, a portion of the video stream may be presented and/or played back by playback components 133 of recipient 130 while subsequent portions of the video stream are simultaneously being sent to the recipient 130. In some other examples, video stream 142 may be sent to recipient 130 so that recipient 130 can further process the video or store the video in a non-transitory, computer-readable memory.

In further examples, a prior portion of a video stream may be decoded and displayed by a recipient at the same time that a subsequent portion of the video stream 142 is still being sent to the recipient. In some examples, the encoded and transmitted image information may correspond to a live or nearly-live (e.g., with a short time delay of, for example, less than a few tenths of a second, less than a few seconds or less than a few minutes) transmission of an event, such as a playing of a video game, a news conference, real-time video conferencing, a sporting event, surveillance video, and many others. A live or nearly-live transmission of an event that is delivered using streaming technology may be referred to as live-streaming. It is noted however, that the transmission of information depicted in FIG. 1 is not limited to live or nearly-live transmission and may also include sending prior-recorded events, media, or other information.

Transmitter 100 may comprise at least one processor 102 and a non-transitory, computer-readable memory 103. Memory 103 may be effective to store instructions that when executed by at least one processor 102 are effective to perform the various video encoder bit rate stabilization techniques and dynamic encoding techniques described herein. Optionally, transmitter 100 may comprise a camera device 150. Camera device 150 may comprise any type of camera device such as a charge coupled device (CCD) and/or a complementary metal oxide semiconductor (CMOS) image sensor. In various examples, transmitter 100 may further comprise a video data monitor 122. In various examples, video data monitor 122 may monitor frame complexity of source video data to be transmitted to recipient 130. In some examples, video data monitor 122 may monitor frame complexity by determining the compressed frame size (e.g., the number of bits used to encode a frame) of compressed frames encoded by encoder 121 and stored in encoder buffer 125 prior to transmission to recipient 130. In various other examples, video data monitor 122 may determine a complexity of frames to be encoded into one or more compressed frames for transmission to recipient 130. As used herein, the "complexity" of the video data may refer to one or more quantitative values used to describe the video data. As previously described, spatial complexity of frames of raw, unencoded video data may be high pass filtered to determine a spatial complexity value. Thereafter, the spatial complexity may be used to determine an estimated compressed frame size for encoding the frame using a given quantization parameter. The estimated compressed frame size may be compared to a target or "threshold" compressed frame size. In various examples, the target or threshold compressed frame size may be a target frame size surrounded by a tolerance band (e.g., a target value of 50 kB+/−5 kB). The tolerance band may represent a range of frame sizes suitable to maintain a target bit rate of video stream 142. In some examples, middleware 120 may perform quantization parameter adjustment 123 and/or group of pictures (GOP) adjustment 124 to stabilize the bit rate of the encoded video stream 142. For example, if the estimated compressed frame size of a frame is less than the target compressed frame size, quantization parameter adjustment 123 and/or GOP adjustment 124 may be used to increase the bit rate, as described in further detail below. Advantageously, the various bit rate stabilization techniques described herein can be performed across various different codecs (e.g., H.264, H.265, VP9, AV1, etc.).

Encoder 121 may perform a quantization process when encoding frames of video image data to compress the video image data. For example, encoder 121 may perform a discrete cosine transform (DCT), a Fourier transform, a Hadamard transform, or another "lossy" or lossless image transform in order to represent the video image data in the frequency domain. In DCT, coefficients of different frequency cosine waves are calculated based on the contribution of the different frequency cosine waves to the portion of the image being encoded. After subjecting image data to a DCT, the lower frequency cosine wave coefficients are typically much larger relative to the higher frequency cosine wave coefficients. This is due to the higher frequency cosine waves typically having a less significant impact (i.e., the higher frequency cosine waves contribute less to the image or portion of the image) on the image being encoded and the lower frequency cosine waves having a more significant impact on the image being encoded. The coefficients of the different frequency cosine waves may be divided by quantization parameters (sometimes referred to herein as "quantization values") during a quantization process and rounded to the nearest integer, to further compress the data. In some examples, the quantization values may be determined using a rate control algorithm. A rate control algorithm may solve an optimization problem to determine the number of bits that should be used to encode macroblocks of image data and/or a frame of image data at a given level of image quality and/or at a given level of distortion. However, in at least some other examples, middleware 120 may dynamically update quantization parameters based on the estimated frame size of the video data. For example, video data monitor 122 may determine that an estimated frame size of a first frame of unencoded video data may be below a target frame size (or threshold frame size) for a first quantization parameter. Middleware 120 may use quantization parameter adjustment 123 to select a second quantization parameter that may result in a larger compressed frame size for the first frame. It should be appreciated that the bitrate may vary somewhat during video stream 142 due to changing complexity of the source video data and due to changing network conditions detected by video data monitor 122 and/or by recipient 130. Lowering quantization values in order to increase frame size may be counter-intuitive in terms of bandwidth conservation. However, dynamically lowering quantization for only low-complexity video data allows for an increase in video quality while simultaneously preventing a downward spiraling of video bitrate due to REMB messages generated based on low-complexity video data.

Reducing the quantization results in larger compressed frame sizes, which in turn increases the bit rate of video stream 142 relative to encoding and transmitting the same video data encoded with a higher quantization parameter. Conversely, if video data monitor 122 determines an estimated compressed frame size for a second uncompressed frame is relatively large in size (e.g., due to high spatial complexity and/or a low quantization parameter), middleware 120 may increase the quantization parameter to reduce the frames size of the compressed frame (e.g., in order to avoid exceeding the maximum channel capacity of network 104). In various examples, video data monitor 122, quantization parameter adjustment 123 and/or GOP adjustment 124 may comprise and/or may be instantiated as a part of a rate control algorithm by a logic controller and/or neural perceptron network in order to dynamically adjust the quantization parameters based on current video data complexity (e.g., based on estimated compressed frame sizes). In at least some examples, an updated quantization value may be determined based at least in part on a maximum bitrate specified by, or otherwise indicated in, an REMB message. The maximum bitrate indicated in an REMB message may be a factor in determining an updated quantization parameter. Other factors may include the complexity of recently-encoded video data (e.g., MAD, SAD, frame size, etc.), the quantization value used to encode the recently-encoded video data, and the amount by which an estimated compressed frame diverges from a target frame size.

In various examples, encoder 121 may comprise a look-ahead buffer. The look-ahead buffer may store raw video data comprising uncompressed frames in a queue awaiting encoding by encoder 121. Video data monitor 122 and/or encoder 121 may determine respective spatial complexities of the uncompressed frames stored in the look-ahead buffer (e.g., by subjecting the uncompressed frames to a high pass filtering operation or using a linear regression). Video data monitor 122 and/or encoder 121 may determine an estimated compressed frame size for each of the uncompressed frames stored in the look-ahead buffer based on a current quantization parameter of encoder 121 and the respective spatial complexities. Video data monitor 122 and/or encoder 121 may compare the estimated compressed frame sizes to a target compressed frame size. In various examples, for a particular uncompressed frame, if the estimated compressed frame size is less than a target frame size threshold (e.g., less than a target frame size tolerance band) encoder 121 may decrease the quantization parameter for encoding the particular uncompressed frame. In various examples, the amount by which the quantization parameter is decreased may be proportional to the amount by which the estimated compressed frame size is less than the target frame size threshold. The quantization parameter may be decreased to a value that may result in an estimated compressed frame size of the particular uncompressed frame being with the target frame size tolerance band. In some further examples, GOP adjustment 124 may be used in addition to quantization parameter adjustment 123 in order to stabilize a bit rate of video stream 142, as described in further detail below.

In various examples, in addition to determining whether or not the estimated compressed frame size of frames of image data to be encoded are below a target frame size threshold, a buffer occupancy level of encoder buffer 125 may be used to determine the quantization parameter. The buffer occupancy level may refer to the percentage of the buffer memory that is occupied by encoded image data (e.g., by frames of video data awaiting transmission). For example, if the buffer occupancy level of encoder buffer 125 is above a threshold buffer occupancy level (e.g., above 60%, 75%, 90%, etc.), quantization parameter adjustment 123 may determine that the quantization parameter of encoder 121 should not be lowered or should be lowered by a lesser amount relative to a case in which the buffer occupancy level of encoder buffer 125 is below the threshold buffer occupancy level. In various other examples, the buffer occupancy level of encoder buffer 125 may be used as an indication of the complexity of the encoded video data stored in encoder buffer 125.

Figure 2:
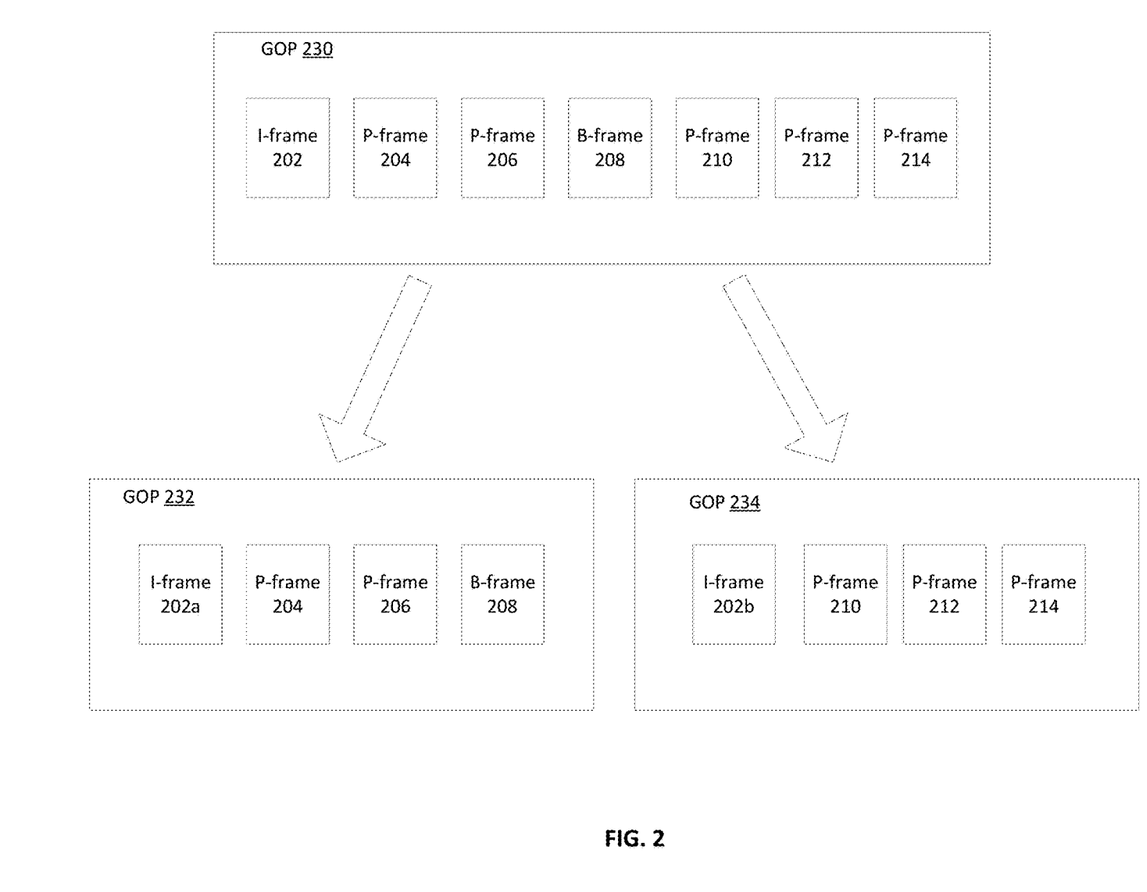
FIG. 2 depicts an example of group of picture adjustment for bit rate stabilization, in accordance with various aspects of the present disclosure.

FIG. 2 depicts an example of GOP adjustment for bit rate stabilization, in accordance with various aspects of the present disclosure. In the example depicted in FIG. 2, video data monitor 122 (depicted in FIG. 1) may be identify a current GOP size. GOP size may refer to the number of frames of video data in a GOP. Video data monitor 122 and/or encoder 121 may determine that the next GOP of video data is to be encoded as GOP 230 comprising I-frame 202, P-frame 204, P-frame 206, B-frame 208, P-frame 210, P-frame 212, and P-frame 214 (e.g., a GOP size of 7 frames). Video data monitor 122 and/or encoder 121 may determine that an estimated average compressed frame size of the frames of GOP 230 is less than a threshold average frame size. In another example, GOP 230 may comprise encoded frames of image data. In such an example, video data monitor 122 and/or encoder 121 may determine that an average compressed frame size of the frames of GOP 230 is less than the threshold average frame size. Accordingly, transmission of GOP 230 to recipient 130 may result in an REMB message estimating a lower bandwidth, which may, in turn, cause encoder 121 to reduce the bit rate of video stream 142. Accordingly, middleware 120 may control encoder 121 to instead encode the frames of GOP 230 as GOP 232 (having a GOP size of 4 frames) and GOP 234 (having a GOP size of 4 frames).

GOP 232 may comprise I-frame 202*a*, followed by P-frame 204, P-frame 206, and/or B-frame 208. GOP 234 may comprise I-frame 202*b*, followed by P-frame 210, P-frame 212, and/or P-frame 214. I-frames are typically larger in size relative to inter-coded frames of image data. Accordingly, by separating GOP 230 into two different GOPs 232 and 234 with each GOP beginning with an I-frame as the initial frame of the GOP, the bitrate of video stream 142 may be increased and/or stabilized. Additionally, providing more frequent I-frames may increase the quality of the video image data by providing a more recent and/or more detailed reference frame for the subsequent P-frames and/or B-frames. Accordingly, setting a shorter GOP size and increasing the frequency of I-frame transmission may be effective to stabilize bit rate of video stream 142 In the example depicted in FIG. 2, I-frame 202*b* may be generated by encoder 121 (depicted in FIG. 1) in order to provide reference for the inter-coded frames of GOP 234.

In various other examples, instead of, or in addition to increasing the frequency of I-frame transmission (e.g., adjusting the GOP size) in order to stabilize the bit rate of a video stream, middleware 120 may control encoder 121 (depicted in FIG. 1) to increase the frame size for one or more frames in a particular GOP by adjusting a quantization parameter of the frame during encoding. Additionally, in some other examples, B-frames of a particular GOP may instead be encoded as P-frames in order to increase the bitrate of video stream 142, as P-frames are larger in size relative to B-frames.

In various examples, a fuzzy logic controller and/or neural network may be used to optimize the bit rate based on the video data (e.g., based on the size of frames, frequency of I-frames, GOP size, etc.). For example, a logic controller may solve an optimization problem using both quantization parameter adjustment and GOP size/I-frame frequency adjustment in order to determine the best combination of quantization parameter adjustment techniques and GOP size/I-frame frequency adjustment techniques that will result in the best video quality per bits trade-off. Accordingly, both quantization parameter adjustment 123 and group of pictures adjustment 124 may be used in combination in order to achieve bit rate stabilization, in accordance with the techniques described herein.

Figure 3:
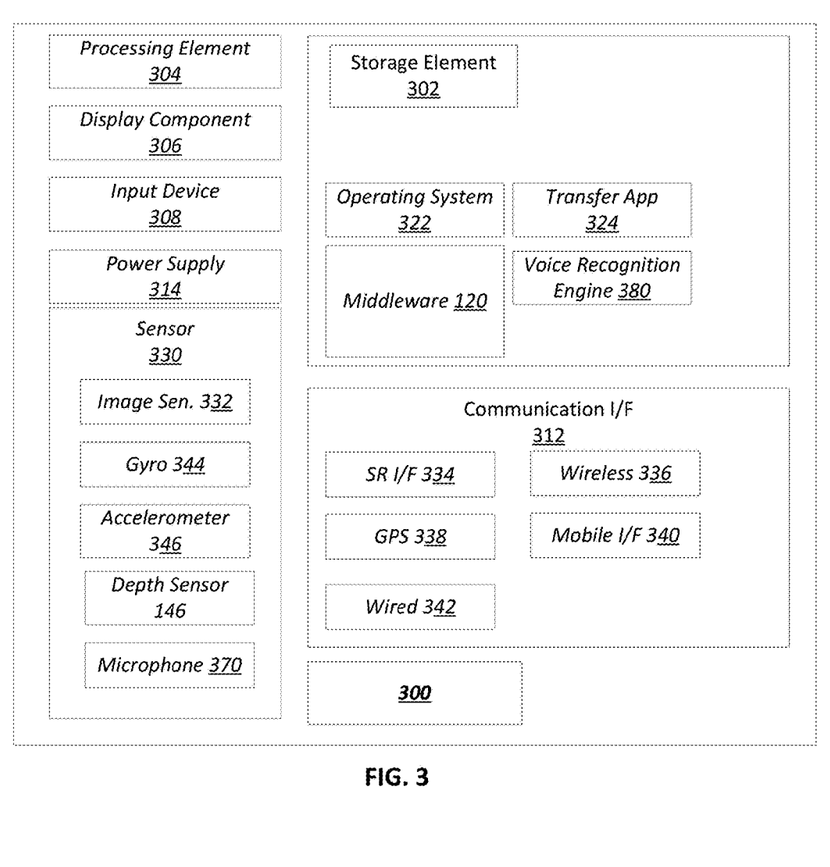
FIG. 3 depicts a recipient computing device effective to perform video encoder bit rate stabilization, in accordance with embodiments of the present disclosure.

FIG. 3 is a block diagram showing an example architecture 300 of a computing device, such as the transmitter 100, recipient 130, and/or other computing devices described herein. It will be appreciated that not all user devices will include all of the components of the architecture 300 and some user devices may include additional components not shown in the architecture 300. The architecture 300 may include one or more processing elements 304 for executing instructions and retrieving data stored in a storage element 302. The processing element 304 may comprise at least one processor. Any suitable processor or processors may be used. For example, the processing element 304 may comprise one or more digital signal processors (DSPs). In some examples, the processing element 304 may be effective to perform object segmentation techniques for image data, as described above. The storage element 302 can include one or more different types of memory, data storage, or computer-readable storage media devoted to different purposes within the architecture 300. For example, the storage element 302 may comprise flash memory, random-access memory, disk-based storage, etc. Different portions of the storage element 302, for example, may be used for program instructions for execution by the processing element 304, storage of images or other digital works, and/or a removable storage for transferring data to other devices, etc.

The storage element 302 may also store software for execution by the processing element 304. An operating system 322 may provide the user with an interface for operating the user device and may facilitate communications and commands between applications executing on the architecture 300 and various hardware thereof. A transfer application 324 may be configured to send and/or receive image and/or video data to and/or from other devices (e.g., a mobile device, remote device, image capture device, and/or display device). In some examples, the transfer application 324 may also be configured to upload the received images to another device that may perform processing as described herein (e.g., a mobile device or another computing device).

In various examples, middleware 120 may be effective to control encoder 121 to control and stabilize the bit rate of video stream 142 based on video data received from video data monitor 122 (depicted in FIG. 1). Middleware 120 may be effective to dynamically adjust quantization parameters, frame size, the frequency of I-frame transmission, etc., in order to stabilize the bit rate of the video stream while maintaining and/or improving video quality. Middleware 120 may monitor video data of a video input stream detected by video data monitor 122 in order to determine whether to raise or lower the quantization parameter and/or adjust the frequency of I-frame transmission.

When implemented in some user devices, the architecture 300 may also comprise a display component 306. The display component 306 may comprise one or more light-emitting diodes (LEDs) or other suitable display lamps. Also, in some examples, the display component 306 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 300 may also include one or more input devices 308 operable to receive inputs from a user. The input devices 308 can include, for example, a push button, touch pad, touch screen, wheel, joystick, keyboard, mouse, trackball, keypad, light gun, game controller, or any other such device or element whereby a user can provide inputs to the architecture 300. These input devices 308 may be incorporated into the architecture 300 or operably coupled to the architecture 300 via wired or wireless interface. In some examples, architecture 300 may include a microphone 370 for capturing sounds, such as voice commands. Voice recognition engine 380 may interpret audio signals of sound captured by microphone 370. In some examples, voice recognition engine 380 may listen for a "wake word" to be received by microphone 370. Upon receipt of the wake word, voice recognition engine 380 may stream audio to a voice recognition server for analysis. In various examples, voice recognition engine 380 may stream audio to external computing devices via communication interface 312.

When the display component 306 includes a touch-sensitive display, the input devices 308 can include a touch sensor that operates in conjunction with the display component 306 to permit users to interact with the image displayed by the display component 306 using touch inputs (e.g., with a finger or stylus). The architecture 300 may also include a power supply 314, such as a wired alternating current (AC) converter, a rechargeable battery operable to be recharged through conventional plug-in approaches, or through other approaches such as capacitive or inductive charging.

The communication interface 312 may comprise one or more wired or wireless components operable to communicate with one or more other user devices. For example, the communication interface 312 may comprise a wireless communication module 336 configured to communicate on a network, such as the network 104, according to any suitable wireless protocol, such as IEEE 802.11 or another suitable wireless local area network (WLAN) protocol. A short range interface 334 may be configured to communicate using one or more short range wireless protocols such as, for example, near field communications (NFC), Bluetooth, Bluetooth LE, etc. A mobile interface 340 may be configured to communicate utilizing a cellular or other mobile protocol. A Global Positioning System (GPS) interface 338 may be in communication with one or more earth-orbiting satellites or other suitable position-determining systems to identify a position of the architecture 300. A wired communication module 342 may be configured to communicate according to the USB protocol or any other suitable protocol.

The architecture 300 may also include one or more sensors 330 such as, for example, one or more position sensors, image sensors, and/or motion sensors. An image sensor 332 is shown in FIG. 3. Some examples of the architecture 300 may include multiple image sensors 332. For example, a panoramic camera system may comprise multiple image sensors 332 resulting in multiple images and/or video frames that may be stitched and may be blended to form a seamless panoramic output.

Motion sensors may include any sensors that sense motion of the architecture including, for example, gyro sensors 344 and accelerometers 346. Motion sensors, in some examples, may be used to determine an orientation, such as a pitch angle and/or a roll angle of a camera. The gyro sensor 344 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 346 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 338 may be utilized as a motion sensor. For example, changes in the position of the architecture 300, as determined by the GPS interface 338, may indicate the motion of the GPS interface 338.

In some examples, architecture 300 may include a depth sensor 146. Depth sensor 146 may be effective to determine a distance between image sensor 332 and a surface detected by depth sensor 146. In some examples, the depth sensor 146 may determine the contours of the surface and may be capable of using computer vision techniques to recognize facial patterns or other markers within the field of view of the depth sensor 146's infrared sensor. In some examples, the depth sensor 146 may include an infrared projector and camera. Processing element 304 may build a depth map based on detection by the infrared camera of a pattern of structured light displayed on a surface by the infrared projector. In some other examples, the depth sensor 146 may include a time of flight camera that may compute distance based on the speed of light by measuring the time of flight of a light signal between a camera of the depth sensor 146 and a surface of an environment. In some examples, processing element 304 may be effective to determine the location of various objects in the physical environment within the field of view of image sensor 332 based on the depth map created by the depth sensor 146. As noted above, in some examples, non-infrared depth sensors, such as passive stereo camera pairs, or non-identical camera pairs, may be used in place of, or in addition to, infrared light sources of depth sensor 146.

Figure 4:
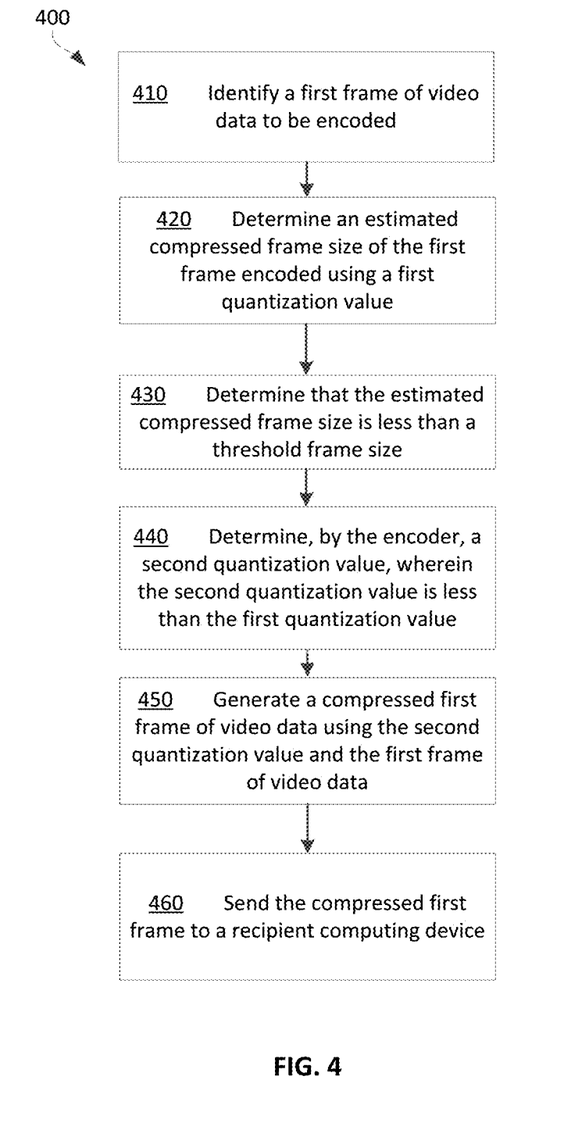
FIG. 4 depicts a flowchart illustrating an example process for performing bit rate stabilization, in accordance with various embodiments of the present disclosure.

FIG. 4 is a flowchart 400 illustrating a first example process for performing video encoder bit rate stabilization that may be used in accordance with the present disclosure. In some examples, the process of FIG. 4 may be performed by a transmitter computing device (e.g., server) that sends video to one or more other computing devices. For example, the process described in FIG. 4 may be performed by transmitter 100 depicted in FIG. 1. In some examples, transmission of a video may be sent as part of a broadcast to multiple recipients, such as a large-scale video broadcast. In some examples, the requested video stream may be sent using a communications protocol that is commonly employed for adaptive bitrate streaming, such as hypertext transfer protocol (HTTP). In some other examples, the process of FIG. 4 may be performed prior to receiving a request for a video streaming transmission. For example, the process of FIG. 4 may be performed to encode video data received from a camera or other device for later transmission or streaming.

The process of FIG. 4 may begin at operation 410, "Identify a first frame of video data to be encoded" At operation 410, at least one processor 102 and/or encoder 121 may identify video data that is to be encoded and/or transmitted over a network (e.g., network 104) to a recipient device, such as recipient 130. In various examples, the video data may be received from a camera device (e.g., camera device 150) or may be received from another computing device and/or generated by transmitter 100. The first frame of video may be in a raw, uncompressed format. The at least one processor 102 and/or the encoder 121 may determine that the first frame of video is to be encoded using a current quantization value of the encoder 121.

Processing may continue from operation 410 to operation 420, "Determine an estimated compressed frame size of the first frame encoded using a first quantization value." At operation 420, at least one processor 102, middleware 120, encoder 121, and/or video data monitor 122 may determine a first complexity value of first video data. The complexity may be determined using various techniques discussed above. For example, the complexity value may be determined by high pass filtering the first frame of image data or using by using a linear regression. In at least some examples, the at least one processor 102, middleware 120, encoder 121, and/or video data monitor 122 may determine an estimated compressed frame size of the first frame using the first complexity value and the first quantization value.

Processing may continue from operation 420 to operation 430, "Determine that the estimated compressed frame size is less than a threshold frame size". At operation 430, the at least one processor 102, middleware 120 and/or video data monitor 122 may determine that the estimated compressed frame size is less than a threshold frame size. In various examples, the estimated compressed frame size may be less than a target frame size or threshold frame size tolerance band needed to maintain a stable bit rate of the video stream 142.

Processing may continue from operation 430 to operation 440, "Determine, by the encoder, a second quantization value, wherein the second quantization value is less than the first quantization value". At operation 440, the encoder 121 may determine a second quantization value. The second quantization value may result in an estimated compressed frame size of the first frame of image data falling within a threshold tolerance band of frame sizes used to maintain a relatively constant bit rate.

Processing may continue from operation 440 to operation 450, "Generate a compressed first frame of video data using the second quantization value and the first frame of video data." At operation 450, encoder 121 may encode the first frame using the second quantization parameter to generate a compressed first frame. The second quantization parameter may be less than the first quantization parameter such that the compressed frame is larger than the estimated compressed frame size, estimated using the first quantization parameter. Accordingly, the compressed first frame generated using the second quantization parameter may be of a larger frame size relative to the same frame compressed using the first quantization parameter.

Processing may continue from operation 450 to operation 460, "Send the compressed first frame over a network to a recipient computing device." At operation 460 the compressed first frame may be sent over a network to the recipient computing device.

Figure 5:
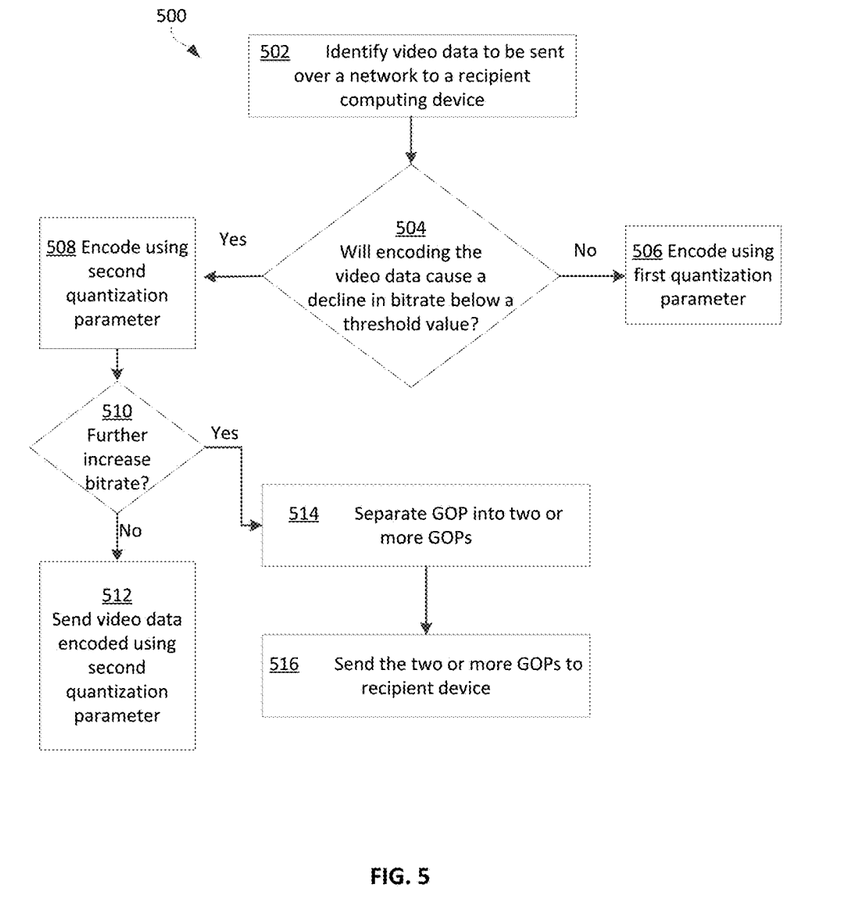
FIG. 5 depicts a flowchart illustrating another example process for performing bit rate stabilization, in accordance with various embodiments of the present disclosure.

FIG. 5 depicts a flowchart 500 illustrating a second example process for performing video encoder bit rate stabilization that may be used in accordance with the present disclosure. In some examples, the process of FIG. 5 may be performed by a transmitter computing device (e.g., server) that sends video to one or more other computing devices. For example, the process described in FIG. 5 may be performed by transmitter 100 depicted in FIG. 1. In some examples, transmission of a video may be sent as part of a broadcast to multiple recipients, such as a large-scale video broadcast. In some examples, the requested video stream may be sent using a communications protocol that is commonly employed for adaptive bitrate streaming, such as hypertext transfer protocol (HTTP). In some other examples, the process of FIG. 5 may be performed prior to receiving a request for a video streaming transmission. For example, the process of FIG. 5 may be performed to encode video data received from a camera or other device for later transmission or streaming.

The process of FIG. 5 may begin at operation 502, "Identify video data to be sent over a network to a recipient computing device." At operation 502, at least one processor 102 may identify video data that is to be encoded and/or transmitted over a network (e.g., network 104) to a recipient device, such as recipient 130. In various examples, the video data may be received from a camera device (e.g., camera device 150) or may be received from another computing device and/or generated by transmitter 100.

The process may continue from operation 502 to operation 504, at which a determination may be made whether encoding the video data using the default encoding parameters will cause the bitrate of video stream 142 to decline below a threshold value. If encoding the video data using the default encoding parameters will not cause the bitrate of video stream 142 to decline below a threshold value, processing may proceed from operation 504 to operation 506, "Encode using first quantization parameter". At operation 506, the video data may be encoded using a first quantization parameter when it is determined that using the first quantization parameter to compress the video data will not cause the bitrate to decline below a threshold level. In various examples, the first quantization parameter may be a default parameter used to encode video data. In some other examples, the first quantization parameter may be determined using a rate control algorithm.

If encoding the video data using the default encoding parameters will cause the bitrate of video stream 142 to decline below a threshold value, processing may proceed from operation 504 to operation 508, "Encode using second quantization parameter." At operation 508, the video data may be encoded with a second quantization parameter. The second quantization parameter may be lower than the first quantization parameter such that encoding the video using the second quantization parameter results in a higher bitrate relative to encoding the video data using the first quantization parameter. In various examples, the second quantization parameter may be predefined or may be dynamically determined based on the relative complexity of the video data to be encoded.

Processing may continue from operation 508 to operation 510 at which a determination may be made whether to further increase the bitrate. If a determination is made that the bit rate is acceptable (e.g., stabilized) after encoding using the second quantization parameter, processing may proceed from operation 510 to operation 512 "send video data encoded using second quantization parameter." At operation 512, the video data encoded using the second quantization parameter may be streamed to recipient 130.

Conversely, if a determination is made at operation 510 that the bitrate is to be further increased, processing may proceed from operation 510 to operation 514, "Separate GOP into two or more GOPs". At operation 514, a GOP of the video data (as encoded using the second quantization parameter) may be separated into two or more GOPs. In various examples, each GOP may begin with an I-frame.

Accordingly, the bitrate may be increased as a result of sending the multiple GOPs rather than sending only the initial, unseparated GOP.

Processing may continue from operation 514 to operation 516, "Send the two or more GOPs to recipient device." At operation 516, the two or more GOPs may be streamed to recipient 130.

Figure 6:
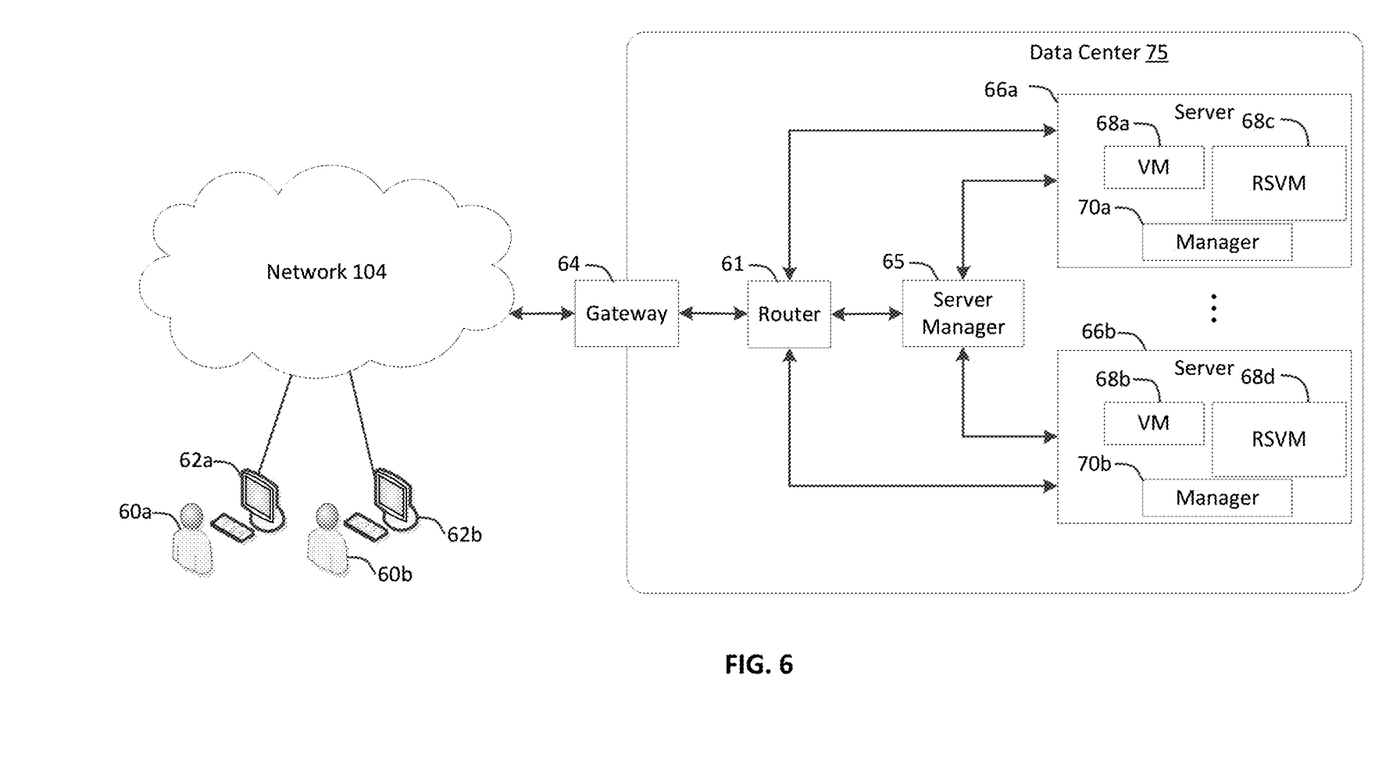
FIG. 6 depicts an example system for sending and providing data over a network, in accordance with various embodiments of the present disclosure.

An example system for sending and providing data will now be described in detail. In particular, FIG. 6 illustrates an example computing environment in which the embodiments described herein may be implemented. FIG. 6 is a diagram schematically illustrating an example of a data center 75 that can provide computing resources to users 60a and 60b (which may be referred herein singularly as user 60 or in the plural as users 60) via user computers or other network-connected devices 62a and 62b (which may be referred herein singularly as computer 62 or in the plural as computers 62) via network 104. In various examples, transmitter 100 depicted in FIG. 1 may be an example of a computer or other network-connected device 62a and/or 62b. Data center 75 may be configured to provide computing resources for executing applications on a permanent or an as-needed basis. The computing resources provided by data center 75 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 75 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to computers 62. User computers 62 may be computers utilized by users 60 or other customers of data center 75. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 75. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 75. In this regard, data center 75 might provide a gateway or web interface through which aspects of its operation may be configured through the use of a web browser application program executing on user computer 62. Alternately, a stand-alone application program executing on user computer 62 might access an application programming interface (API) exposed by data center 75 for performing the configuration operations. Other mechanisms for configuring the operation of various web services available at data center 75 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 70a or 70b (which may be referred herein singularly as instance manager 70 or in the plural as instance managers 70) capable of executing the virtual machine instances 68. The instance managers 70 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 75 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 75, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 75 shown in FIG. 6, a server manager 65 is also employed to at least in part direct various communications to, from and/or between servers 66a and 66b. While FIG. 6 depicts router 61 positioned between gateway 64 and server manager 65, this is merely an exemplary configuration. In some cases, for example, server manager 65 may be positioned between gateway 64 and router 61. Server manager 65 may, in some cases, examine portions of incoming communications from user computers 62 to determine one or more appropriate servers 66 to receive and/or process the incoming communications. Server manager 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Server manager 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 75 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of lower latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A method of adjusting a bit rate of a portion of a video stream, the method comprising:
    determining a first frame of the video stream to be encoded and sent over a network to a recipient computing device;
    determining a first quantization value of an encoder, wherein the first quantization value was used to encode a previous frame of the video stream, prior to the first frame;
    determining a first estimated compressed frame size of the first frame when encoded with the first quantization value;
    determining that the first estimated compressed frame size is less than a target frame size tolerance band, wherein the target frame size tolerance band represents a range of frame sizes suitable to maintain a target bit rate of the video stream;
    determining a second quantization value, wherein the second quantization value is less than the first quantization value;
    determining a second estimated compressed frame size of the first frame when encoded with the second quantization value;
    determining that the second estimated compressed frame size is within the target frame size tolerance band;
    generating a compressed first frame by encoding the first frame of the video stream with the second quantization value; and
    sending the compressed first frame over the network to the recipient computing device.

2. The method of claim 1, further comprising:
    determining a first group of pictures (GOP) of the video stream to be sent over the network to the recipient computing device, the first GOP comprising a first plurality of frames of the video data following the first frame;

separating the first plurality of frames of the first GOP into at least a second GOP and a third GOP, wherein an initial frame of the second GOP is a first intra-coded frame (I-frame) and an initial frame of the third GOP is a second I-frame;

sending the second GOP over the network to the recipient computing device; and sending the third GOP over the network to the recipient computing device.

3. The method of claim 1, wherein determining the first estimated compressed frame size of the first frame when encoded with the first quantization value comprises determining a spatial complexity value of the first frame by high pass filtering image data of the first frame, wherein the spatial complexity value is associated with an amount of entropy of pixel data in the first frame.

4. A method, comprising:

identifying, by an encoder, a first frame of video data to be encoded;

determining, by the encoder, an estimated compressed frame size of the first frame encoded using a first quantization value;

determining that the estimated compressed frame size is less than a threshold frame size wherein the threshold frame size comprises a target frame size and a tolerance band representing a range of frame sizes surrounding the target frame size;

determining, by the encoder, a second quantization value, wherein the second quantization value is less than the first quantization value;

generating, by the encoder, a compressed first frame of video data using the second quantization value and the first frame of video data; and sending the compressed first frame to a computing device.

5. The method of claim 4, further comprising:

determining a first group of pictures (GOP) of the video data;

generating a second GOP from first frames of the first GOP, wherein the second GOP begins with a first intra-coded frame (I-frame);

generating a third GOP from second frames of the first GOP, wherein the third GOP begins with a second I-frame;

sending the second GOP to the computing device; and sending the third GOP to the computing device.

6. The method of claim 4, further comprising:

identifying, by an encoder, a second frame of video data following the first frame;

determining a second estimated compressed frame size of the second frame encoded using a second quantization value;

determining that the second estimated compressed frame size is greater than a second threshold frame size;

determining, by the encoder, a third quantization value, wherein the third quantization value is greater than the second quantization value;

generating, by the encoder, a compressed second frame of video data using the third quantization value and the second frame of video data; and sending the compressed second frame to the computing device.

7. The method of claim 4, further comprising:

receiving a receiver estimated maximum bitrate (REMB) message specifying a maximum bitrate to be used by the encoder to encode the video data;

identifying, by an encoder, a second frame of video data following the first frame;

determining a second estimated compressed frame size of the second frame encoded using the second quantization value;

determining that the second estimated compressed frame size is less than the threshold frame size;

determining, by the encoder, a third quantization value, wherein the third quantization value is less than the second quantization value, wherein the third quantization value is determined based at least in part on the maximum bitrate;

generating, by the encoder, a compressed second frame of video data using the third quantization value and the second frame of video data; and sending the compressed second frame to the computing device.

8. The method of claim 4, further comprising:

determining a first group of pictures (GOP) of the video data;

separating the first GOP into a second GOP and a third GOP;

generating an intra-coded frame (I-frame) for the third GOP;

sending the second GOP to the computing device; and sending the third GOP to the computing device, wherein an initial frame of the third GOP is the I-frame.

9. The method of claim 4, wherein determining the estimated compressed frame size of the first frame encoded using the first quantization value comprises determining a spatial complexity value of the first frame, wherein the spatial complexity value is associated with an amount of entropy of pixel data in the first frame.

10. The method of claim 4, further comprising:

determining a first group of pictures (GOP) of the video data;

identifying a second frame of the first GOP;

determining that the second frame is to be encoded by the encoder as a bi-directional predictive frame (B-frame) based on an ordering of frames of the first GOP; and encoding the second frame as a predictive frame (P frame).

11. The method of claim 4, further comprising:

determining that a buffer occupancy level of the encoder is above a threshold buffer occupancy level; and determining the second quantization value based at least in part on the determining that the buffer occupancy level of the encoder is above the threshold buffer occupancy level.

12. A first computing device comprising:

at least one processor; and a non-transitory computer-readable memory configured in communication with the processor, the memory storing one or more instructions that when executed by the at least one processor cause the computing device to perform a method comprising:

identifying a first frame of video data to be encoded;

determining an estimated compressed frame size of the first frame encoded using a first quantization value;

determining that the estimated compressed frame size is less than a threshold frame size wherein the threshold frame size comprises a target frame size and a tolerance band representing a range of frame sizes surrounding the target frame size;

determining a second quantization value, wherein the second quantization value is less than the first quantization value;

generating a compressed first frame of video data using the second quantization value and the first frame of video data; and sending the compressed first frame to a second computing device.

13. The first computing device of claim 12, wherein the instructions, when executed by the at least one processor are effective to perform the method, further comprising:
   determining a first group of pictures (GOP) of the video data;
   generating a second GOP from first frames of the first GOP, wherein the second GOP begins with a first intra-coded frame (I-frame);
   generating a third GOP from second frames of the first GOP, wherein the third GOP begins with a second I-frame;
   sending the second GOP to the second computing device; and
   sending the third GOP to the second computing device.

14. The first computing device of claim 12, wherein the instructions, when executed by the at least one processor are effective to perform the method, further comprising:
   identifying, by an encoder, a second frame of video data following the first frame;
   determining a second estimated compressed frame size of the second frame encoded using a second quantization value;
   determining that the second estimated compressed frame size is greater than a second threshold frame size;
   determining, by the encoder, a third quantization value, wherein the third quantization value is greater than the second quantization value;
   generating, by the encoder, a compressed second frame of video data using the third quantization value and the second frame of video data; and
   sending the compressed second frame to the second computing device.

15. The first computing device of claim 12, wherein the instructions, when executed by the at least one processor are effective to perform the method, further comprising:
   receiving a receiver estimated maximum bitrate (REMB) message specifying a maximum bitrate to be used by an encoder to encode the video data;
   identifying, by an encoder, a second frame of video data following the first frame;
   determining a second estimated compressed frame size of the second frame encoded using a second quantization value;
   determining that the second estimated compressed frame size is less than the threshold frame size;
   determining, by the encoder, a third quantization value, wherein the third quantization value is less than the second quantization value, wherein the third quantization value is determined based at least in part on the maximum bitrate;
   generating, by the encoder, a compressed second frame of video data using the third quantization value and the second frame of video data; and sending the compressed second frame to the second computing device.

16. The first computing device of claim 12, wherein the instructions, when executed by the at least one processor are effective to perform the method, further comprising:
   determining a first group of pictures (GOP) of the video data;
   separating the first GOP into a second GOP and a third GOP;
   generating an intra-coded frame (I-frame) for the third GOP;
   sending the second GOP to the second computing device; and
   sending the third GOP to the second computing device, wherein an initial frame of the third GOP is the I-frame of the third GOP.

17. The first computing device of claim 12, wherein determining the estimated compressed frame size of the first frame encoded using the first quantization value comprises determining a spatial complexity value of the first frame, wherein the spatial complexity value is associated with an amount of entropy of pixel data in the first frame.

18. The first computing device of claim 12, wherein the instructions, when executed by the at least one processor are effective to perform the method, further comprising:
   determining a first group of pictures (GOP) of the video data;
   identifying a second frame of the first GOP;
   determining that the second frame is to be encoded as a bi-directional predictive frame (B-frame) based on an ordering of frames of the first GOP; and
   encoding the second frame as a predictive frame (P frame).

19. The first computing device of claim 12, wherein the instructions, when executed by the at least one processor are effective to perform the method, further comprising:
   determining that a buffer occupancy level of an encoder is above a threshold buffer occupancy level; and
   determining the second quantization value based at least in part on the determining that the buffer occupancy level of the encoder is above the threshold buffer occupancy level.

20. The first computing device of claim 12, wherein the instructions, when executed by the at least one processor are effective to perform the method, further comprising:
   determining a first group of pictures (GOP) of the video data comprising a first intra-coded frame (I-frame);
   determining that a spatial complexity value of the first I-frame is below a threshold value;
   generating a second I-frame, wherein one or more frames of the first GOP are decodable using the second I-frame;
   separating the first GOP into a second GOP and a third GOP, wherein an initial frame of the third GOP is the second I-frame; and
   sending the second GOP and the third GOP to the second computing device.

* * * * *